W. S. WRIGHT.
DENTAL MANDREL FOR HOLDING STONES AND SANDPAPER DISKS.
APPLICATION FILED APR. 29, 1920.
1,352,395. Patented Sept. 7, 1920.
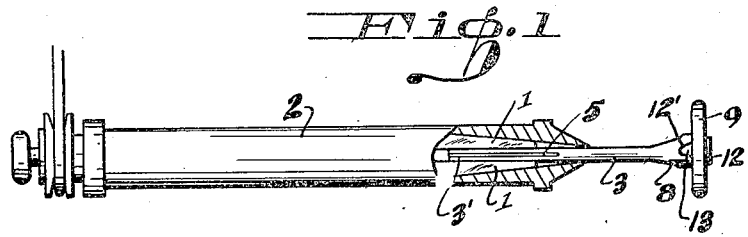
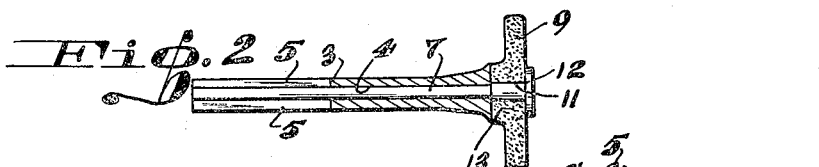
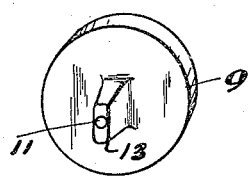
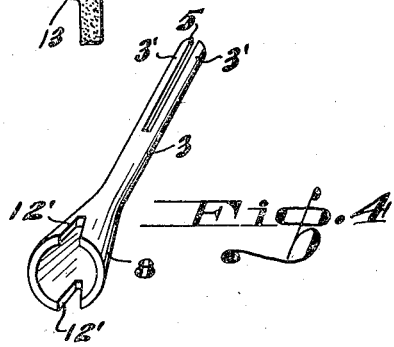
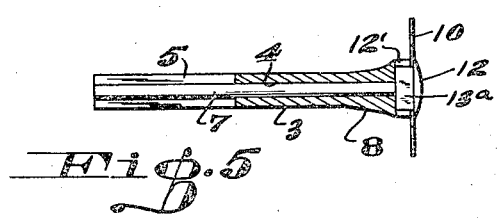
Walter S. Wright — INVENTOR.
BY
Hazard & Miller
ATTORNEYS

UNITED STATES PATENT OFFICE.

WALTER S. WRIGHT, OF LOMPOC, CALIFORNIA.

DENTAL MANDREL FOR HOLDING STONES AND SANDPAPER DISKS.

1,352,395.  Specification of Letters Patent.  Patented Sept. 7, 1920.

Application filed April 29, 1920. Serial No. 377,614.

*To all whom it may concern:*

Be it known that I, WALTER SCOTT WRIGHT, a citizen of the United States, residing at Lompoc, in the county of Santa Barbara and State of California, have invented new and useful Improvements in Dental Mandrels for Holding Stones and Sandpaper Disks, of which the following is a specification.

This invention is a dental mandrel for holding stones, sand paper disks and the like and has for its object the provision of a construction in which a stone or disk may be quickly secured to a mandrel, and the mandrel and the instrument held against longitudinal movement in a tool chuck and against rotation relative thereto.

Further objects of the invention will be readily understood from the following description of the accompanying drawings, in which the Figure 1 is a side elevation, partly broken away, of the improved mandrel in position within a tool chuck.

Fig. 2 is an enlarged longitudinal section through the mandrel having a stone attached thereto.

Fig. 3 is a rear perspective view of a stone adapted to be held by the mandrel.

Fig. 4 is a perspective view of the mandrel.

Fig. 5 is a view similar to Fig. 2 showing a sand paper disk attached to the mandrel.

Fig. 6 is a perspective view of the clamping rod employed in connection with a sand paper disk.

The improved mandrel is adapted to be clamped between the jaws 1 of an usual tool chuck 2, the jaws being clamped around the mandrel in any well known or preferred manner.

The improved mandrel is shown as a hollow rod 3 having the bore 4 therethrough and arranged to be received within the tool chuck and extend longitudinally thereof outwardly beyond the jaws 1. The end of the mandrel received within the tool chuck is slotted for a considerable distance at opposite sides as shown at 5, so that when the jaws of the tool chuck are tightened upon the mandrel the ends 3' of the mandrel will be clamped upon a rod 7 extending through the bore of the hollow mandrel.

The outer end of the mandrel is, preferably, provided with an outwardly flaring enlarged head 8 against which a suitable instrument, such as the stone 9 or a sand paper disk 10, is adapted to be received. The stone 9 is provided with a central opening 11 through which the clamping rod 7 is received, the head 12 of said clamping rod resting against the outer end of the stone and the clamping rod being moved into the mandrel as far as it will go to clamp the stone between the head of the clamping rod and the head of the mandrel, the clamping rod being held in this position within the mandrel by the clamping engagement of the ends 3' of the mandrel against the clamping rod.

When a sand paper disk is to be secured to the mandrel the center of the disk is pierced by the clamping rod and the latter is then placed in the mandrel and the sand paper disk is clamped between the head of the mandrel and the head of the clamping rod, as previously described. By the constructions thus described it will be seen that an instrument may be readily clamped against the head of a mandrel, the clamping rod for the instrument being held against longitudinal displacement by the frictional engagement of the mandrel.

Means are also provided for preventing rotary movement of an instrument relative to the mandrel carrying the instrument. For this purpose the tool is arranged to abut against the mandrel so as to prevent rotation of the tool. This abutting engagement, preferably, includes notches 12' formed in the end of the enlarged head 8 of the mandrel and a coöperating lug carried by the tool and arranged to be received in said notches. When the stone 9 is secured to the mandrel this lug is, preferably, formed upon the rear face of the stone as shown at 13, and when a sand paper disk is secured to the mandrel the lug is, preferably, provided upon the rear face of the head 12 of the clamping rod as shown at 13ª. In this latter construction the sand paper disk will be pierced by both the clamping rod and the lug 13ª.

It will be apparent that various changes may be made in the constructions as thus described.

What is claimed is:

A device of the character described comprising a mandrel having a split end; a clamping rod for an instrument extending through said mandrel and clamped therein at said split end.

In testimony whereof I have signed my name to this specification.

W. S. WRIGHT.